US012196879B2

(12) United States Patent
Englesbe et al.

(10) Patent No.: US 12,196,879 B2
(45) Date of Patent: Jan. 14, 2025

(54) LASER PLASMA-BASED GENERATION OF ULTRAWIDEBAND MICROWAVE SIGNALS

(71) Applicant: The Government of the United States of America, as represented by the Secretary of the Navy, Arlington, VA (US)

(72) Inventors: Alexander C. Englesbe, Washington, DC (US); Jennifer A. Elle, Albuquerque, NM (US); Andreas Schmitt-Sody, Albuquerque, NM (US); Travis M. Garrett, Albuquerque, NM (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 409 days.

(21) Appl. No.: 17/828,095

(22) Filed: May 31, 2022

(65) Prior Publication Data

US 2022/0390553 A1   Dec. 8, 2022

Related U.S. Application Data

(60) Provisional application No. 63/196,726, filed on Jun. 4, 2021.

(51) Int. Cl.
*G01S 13/02* (2006.01)
*G01S 7/282* (2006.01)

(52) U.S. Cl.
CPC ......... *G01S 7/282* (2013.01); *G01S 13/0209* (2013.01)

(58) Field of Classification Search
CPC .............................. G01S 13/0209; G01S 7/282
See application file for complete search history.

(56) References Cited

FOREIGN PATENT DOCUMENTS

CN    106125451 A  * 11/2016   ............... G02F 2/00

OTHER PUBLICATIONS

A.A. Antipov et al., "Microwave generation in an optical breakdown plasma created by modulated laser radiation," Jun. 1990, Soviet Jorunal of Quantum Electronics 20, p. 664-666 (Year: 1990).*

(Continued)

*Primary Examiner* — David E Smith
*Assistant Examiner* — Hsien C Tsai
(74) *Attorney, Agent, or Firm* — US Naval Research Laboratory; Joslyn J. Barritt

(57) ABSTRACT

A method for generating ultrawideband pulsed microwave signals from optical field ionization of a gas with an ultrashort laser pulse, where the amplitude and frequency of the signals can be controlled via the characteristics of the laser pulse and/or the gas. The center frequency of the spectrum of the microwave signal can be controlled by changing the laser pulse energy. The amplitude of the microwave signal can be controlled by changing the wavelength of the laser pulses. The amplitude and frequency of the microwave signal can be tuned by controlling the pressure of the gas medium. The location at which the microwave signal is generated can be controlled by controlling the location at which the laser pulse creates a plasma. Interference among microwave signals resulting from multiple laser-produced plasmas can be used to construct an ultrawideband microwave signal having a predetermined amplitude and frequency.

14 Claims, 6 Drawing Sheets

(56) References Cited

OTHER PUBLICATIONS

J.S. Lee et al., "Novel Low-Cost Ultra-Wideband, Ultra-Short-Pulse Transmitter with MESFET Impulse-Shaping Circuitry for Reduced Distortion and Improved Pulse Repetition Rate," IEEE Microwave and Wireless Components Letters 11, 208 (2001).
L. Smaïni et al., "Single-Chip CMOS Pulse Generator for UWB Systems" IEEE Journal of Solid-State Circuits 41, 1551 (2006).
F. Zito et al., "UWB CMOS Monocycle Pulse Generator," IEEE Transactions on Circuits and Systems—I: Regular Papers 57, 2654 (2010).
P. Chen et al., "3-D Radar Imaging Based on a Synthetic Array of 30-GHz Impulse Radiators with On-Chip Antennas in 130nm SiGe BiCMOS," IEEE Transactions on Microwave Theory and Techniques 65, 4373 (2017).
M.M. Assefzadeh et al., "Broadband Oscillator-Free THz Pulse Generation and Radiation Based on Direct Digital-to-Impulse Architecture," IEEE Journal of Solid State Circuits 52, 2905 (2017).
Keysight Technologies, "The ABC's of Arbitrary Waveform Generation," Application Note 5989-4138 (2014).
Tekronix, Inc., "XYZs of Signal Generators," Tektronix Primer 76W-16672-7 (2020).
D. H. Auston et al., "Generation and detection of millimeter waves by picosecond photoconductivity," Appl. Phys. Lett. 43, 631 (1983).
M. H. Khan et al., "Ultrabroad-bandwidth arbitrary radiofrequency waveform generation with a silicon photonic chip-based spectral shaper," Nature Photonics 4, 117 (2010).
J. Chou et al., "Adaptive RF photonic arbitrary waveform generator," IEEE Photonics Technology Letters 15, 581 (2003).
A. Rashidinejad et al., "Recent Advances in Programmable Photonic-Assisted Ultrabroadband Radio-Frequency Arbitrary Waveform Generation," IEEE Journal of Quantum Electronics 52, 0600117 (2016).
A.A. Antipov et al., "Microwave generation in an optical breakdown plasma created by modulated laser radiation," Soviet Journal of Quantum Electronics 20, 664 (1990).
M. N. Shneider et al., "Coherent microwave radiation from a laser induced plasma," Applied Physics Letters 101, 264105 (2012).
A. Englesbe et al., "Gas pressure dependence of microwave pulses generated by laser-produced filament plasmas," Optics Letters 20, 4953 (2018).
S. Tzortzakis et al., "Coherent subterahertz radiation from femtosecond infrared filaments in air," Optics Letters 27, 1944 (2002).
G. Méchain et al., "A virtual antenna produced in air by intense femtosecond laser pulses," Proceedings of SPIE vol. 5989: Technologies for Optical Countermeasures II; Femtosecond Phenomena II; and Passive Millimetre-Wave and Terahertz Imaging II; 59890S (2005).
A. Mitrofanov et al., "Coherently enhanced microwave pulses from midinfrared-driven laser plasmas," Optics Letters 46, 1081 (2021).
T. Garrett, et al., "Generation of radio frequency radiation by femtosecond filaments," Physical Review E 104, L063201 (2021).
A. Englesbe, "Broadband radiofrequency radiation from air plasma using a LWIR USPL," Long Wavelength USPL ONR MURI Review (2019).
A. Englesbe, "Comparison of broadband microwave generation from single and two color ultrafast mid IR laser produced plasmas in atmosphere," 60th Annual Meeting of the APS Division of Plasma Physics (2018).

* cited by examiner

LASER PLASMA-BASED GENERATION OF ULTRAWIDEBAND MICROWAVE SIGNALS

CROSS-REFERENCE

This Application is a Nonprovisional of and claims the benefit of priority under 35 U.S.C. § 119 based on U.S. Provisional Patent Application No. 63/196,726 filed on Jun. 4, 2021. The Provisional Application and all references cited herein are hereby incorporated by reference into the present disclosure in their entirety.

FEDERALLY-SPONSORED RESEARCH AND DEVELOPMENT

The U. S. Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing Navy Case #210291.

TECHNICAL FIELD

The present invention relates to the generation of ultrawideband pulsed microwave signals due to optical field ionization of a gas with an ultrashort laser pulse, where the amplitude and frequency of the signals can be controlled via the characteristics of the laser pulse and/or the gas.

BACKGROUND

A waveform generator is a generic term that describes a device that produces a controllable time-varying signal. The type of control that the device effects upon the signal falls into one of three categories of increasing sophistication: amplitude control, amplitude and frequency control, or amplitude, frequency, and phase control. The latter is equivalent to controlling all attributes of the signal, and electronic devices which accomplish this are called arbitrary waveform generators, where the term "arbitrary waveform" generalizes the description of the waveform shape beyond common ones such as sine, square, exponential, chirped, etc. but does not imply that the waveform has randomly varying characteristics. Waveform generators (arbitrary or not) exist in continuous wave (CW) and pulsed formats.

A fundamental property of pulsed signals is that their frequency spectrum cannot be described as consisting of a single frequency, but rather a range of frequencies distributed about a center frequency. The range of frequencies is called the bandwidth, and when the bandwidth is approximately equal to or greater than the central frequency, the signal is said to be ultrawideband. The Fourier transform of an ultrawideband frequency spectrum is a signal whose variation in time consists of only one or a few cycles.

Ultrawideband microwave signals are difficult to generate and transmit in free space. It is possible to produce them using solid-state electronic circuits, as well as through several related schemes which rely on conversion of a pulsed optical signal into a microwave one by means of a photodiode or other similar photodetector.

One existing solid-state electronic technology uses a step recovery diode (SRD). In this technique, a reverse-biased SRD can produce current pulses of sub-nanosecond duration. See J. S. Lee et al., "Novel Low-Cost Ultra-Wideband, Ultra-Short-Pulse Transmitter with MESFET Impulse-Shaping Circuitry for Reduced Distortion and Improved Pulse Repetition Rate," *IEEE Microwave and Wireless Components Letters* 11, 208 (2001).

The other solid-state technologies consist of purpose-built integrated circuits fabricated using a complementary metal-oxide-semiconductor (CMOS) process. See L. Smaïni et al., "Single-Chip CMOS Pulse Generator for UWB Systems" *IEEE Journal of Solid-State Circuits* 41, 1551 (2006); F. Zito et al., "UWB CMOS Monocycle Pulse Generator," *IEEE Transactions on Circuits and Systems—I: Regular Papers* 57, 2654 (2010); P. Chen et al., "3-D Radar Imaging Based on a Synthetic Array of 30-GHz Impulse Radiators with On-Chip Antennas in 130 nm SiGe BiCMOS," *IEEE Transactions on Microwave Theory and Techniques* 65, 4373 (2017); and M. M. Assefzadeh et al., "Broadband Oscillator-Free THz Pulse Generation and Radiation Based on Direct Digital-to-Impulse Architecture," *IEEE Journal of Solid State Circuits* 52, 2905 (2017). Some of these integrated circuits include antennas that can radiate the signals. See Chen, supra, and Assefzadeh, supra.

More complicated system-scale arbitrary waveform generators have been sold as electronic testing equipment by, e.g., Keysight Technologies and Tektronix, Inc., but are limited in the maximum achievable bandwidth relative to the other technologies discussed above. See Keysight Technologies, "The ABC's of Arbitrary Waveform Generation," Application Note 5989-4138 (2014); and Tekronix, Inc., "XYZs of Signal Generators," Tektronix Primer 76 W-16672-7 (2020).

Other conventional methods for generating ultrawideband signals involve ultrashort pulse lasers, i.e., a lasers having a pulse duration of less than one picosecond. One such method uses a photoconductive antenna, where an ultrashort laser pulse irradiates a small gap between electrical contacts in a semiconductor chip. The size of the gap defines the chip's resonance frequency and therefore the frequency of the signal generated by the pulse. See D. H. Auston et al., "Generation and detection of millimeter waves by picosecond photoconductivity," *Appl. Phys. Lett.* 43, 631 (1983).

In another method, ultrawideband arbitrary waveform generators that use ultrashort laser pulses are used. Such methods typically involve the creation of an optical frequency comb produced by an ultrashort pulse laser oscillator. See M. H. Khan et al., "Ultrabroad-bandwidth arbitrary radiofrequency waveform generation with a silicon photonic chip-based spectral shaper," *Nature Photonics* 4, 117 (2010); J. Chou et al., "Adaptive RF-photonic arbitrary waveform generator," *IEEE Photonics Technology Letters* 15, 581 (2003); and A. Rashidinejad et al., "Recent Advances in Programmable Photonic-Assisted Ultrabroadband Radio-Frequency Arbitrary Waveform Generation," *IEEE Journal of Quantum Electronics* 52, 0600117 (2016).

These schemes involve dispersing the frequency spectrum of the laser pulses in time or space using for example, a length of optical fiber to provide group velocity dispersion, or a diffraction grating that maps each component frequency of the spectrum to a unique optical path. After dispersing the frequency spectrum, a modulator is used to precisely adjust the amplitude and phase of each of its component frequencies to produce a particular, desired laser pulse envelope.

In practice, this step may be accomplished with a spatial light modulator (SLM). The envelope of a laser pulse can be considered as a continuous curve in time that outlines the extremes of its oscillating electromagnetic field. Once the SLM imparts the desired modulation to the frequency spectrum, the laser pulse may undergo an additional step where more group velocity dispersion is added to stretch the shape of its envelope such that its characteristic time dependence falls in the microwave regime.

A common element of all these schemes is that once the precisely modulated laser pulse with the desired laser pulse envelope has been created, the laser pulse illuminates a photodetector that generates an electrical signal whose time dependence replicates that of the laser pulse envelope and produces a controllable ultrawideband arbitrary waveform. The waveform then exists within a microwave circuit, and transmission into free space would require an additional, specially designed element that converts it into electromagnetic radiation.

Other kinds of microwave signals generated by laser-produced plasmas have also been previously theoretically proposed or experimentally observed. In one method, long laser pulses with durations on the order of microseconds were used to make an air plasma, while the laser amplitude was modulated at a single microwave frequency. See A. A. Antipov et al., "Microwave generation in an optical breakdown plasma created by modulated laser radiation," *Soviet Journal of Quantum Electronics* 20, 664 (1990). This caused the air plasma to radiate at the frequency of the amplitude modulation.

Another proposed method for creating a microwave signal having a controllable amplitude and/or a controllable frequency uses two ultrashort laser pulses propagating through a plasma, where each of the two pulses has its own wavelength that differs in value from the wavelength of the other laser pulse. In this method, the difference in the wavelengths of the two laser pulses creates a "beat frequency"

$$f_{beat} = c\left(\frac{1}{\lambda_1} - \frac{1}{\lambda_2}\right),$$

where c is the speed of light, $\lambda_1$ is the wavelength of the first laser pulse, while $\lambda_2$ is the wavelength of the second. The difference in the wavelengths of the two laser pulses produces an oscillating current in the plasma at $f_{beat}$, which in turn generates a narrowband (that is, small bandwidth), instead of an ultrawideband, microwave signal having a frequency equal to $f_{beat}$. The frequency of the thus-generated microwave signal can be controlled by controlling the difference between the wavelengths of the two laser pulses, e.g., by changing the wavelength of one laser pulse while leaving constant the wavelength of the other. See M. N. Shneider et al., "Coherent microwave radiation from a laser induced plasma," *Applied Physics Letters* 101, 264105 (2012).

That ultrawideband microwave signals are produced from ultrashort laser pulses has been observed by the inventors of the present invention as well as by others. See A. Englesbe et al., "Gas pressure dependence of microwave pulses generated by laser-produced filament plasmas," *Optics Letters* 20, 4953 (2018); S. Tzortzakis et al., "Coherent subterahertz radiation from femtosecond infrared filaments in air," *Optics Letters* 27, 1944 (2002); G. Méchain et al., "A virtual antenna produced in air by intense femtosecond laser pulses," *Proceedings of SPIE* Vol. 5989: *Technologies for Optical Countermeasures II; Femtosecond Phenomena II; and Passive Millimetre-Wave and Terahertz Imaging II;* 59890S (2005); and A. Mitrofanov et al., "Coherently enhanced microwave pulses from midinfrared-driven laser plasmas," *Optics Letters* 46, 1081 (2021). However, neither Tzortzakis nor Méchain demonstrated that radiation separate from the laser pulses was generated.

More importantly, none of the prior art approaches contemplated that the input laser pulse could be manipulated to control the characteristics of the laser-generated microwave signal in order to obtain a desired result.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present disclosure provides a method for generating an ultrawideband pulsed microwave signal from optical field ionization of a gas with an ultrashort laser pulse, where the amplitude and frequency of the signal can be controlled by controlling the characteristics of the laser pulse and/or the gas.

In some embodiments, the amplitude of the microwave signal can be controlled by changing the wavelength of the laser pulses.

In some embodiments, the center frequency of the spectrum of the microwave signal can be controlled by changing the laser pulse energy in accordance with the present invention.

In some embodiments, the amplitude and frequency of the microwave signal can be tuned by controlling the pressure of the gas medium through which the laser pulse travels.

In some embodiments, the location at which the microwave signal is generated can be controlled by controlling the location within the gas medium at which the laser pulse creates a plasma.

In some embodiments, interference among microwave signals resulting from multiple laser-produced plasmas can be used to construct an ultrawideband microwave signal having a predetermined amplitude and frequency.

DETAILED DESCRIPTION

Figure 1:
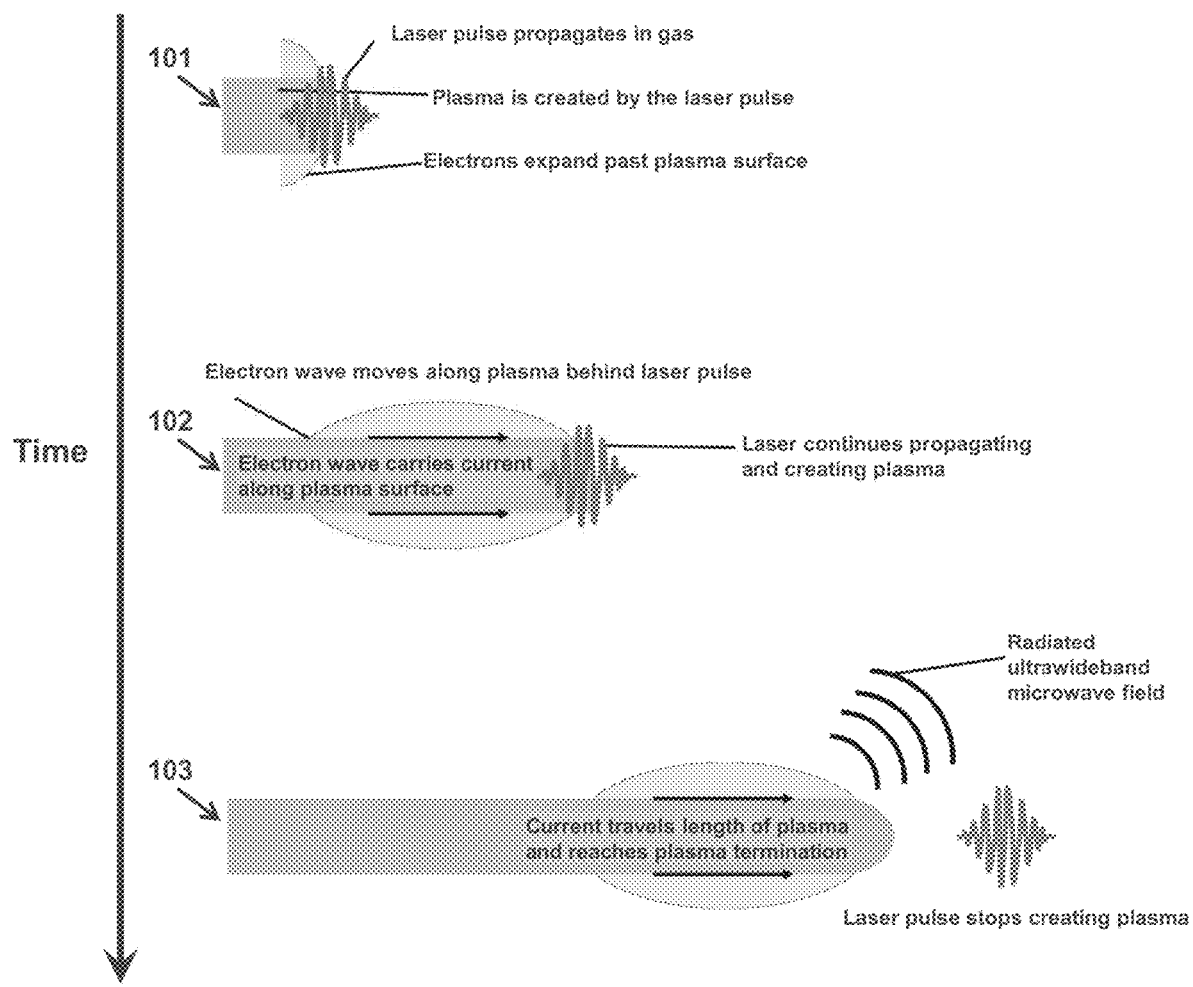
FIG. 1 is a block schematic illustrating aspects of a process by which a laser creates a plasma which in turn radiates a microwave signal in accordance with the present invention.

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present invention provides a method for generating pulsed ultrawideband electromagnetic microwave signals having a controllable amplitude and center frequency in free space from ultrashort laser pulses propagating through a gas medium. We use the term "radiation" to refer to a signal that propagates as an electromagnetic wave in free space. The radiation of the microwaves is not to be considered distinct from the microwave signals the invention produces.

As noted above, microwave radiation resulting from ultrashort laser pulses has previously been observed by the inventors of the present invention as well as by others.

See A. Englesbe et al., supra; S. Tzortzakis et al., supra; G. Méchain et al., supra; and A. Mitrofanov et al., supra. However, none of these initial observations appreciated the potential technological implications of such radiation, nor did they demonstrate that the characteristics of the laser pulses (e.g., the laser pulse energy, the laser wavelength, and/or the laser focusing geometry) or the characteristics (e.g., gas pressure) of the gas medium could be tuned to obtain an ultrawideband microwave signal having a predetermined amplitude or a predetermined frequency. In addition, none of these previous observations describe leveraging the properties of a longitudinal surface current caused by an expanding electron wave, which is required for correctly translating the user-controlled aspects of the laser pulses into a microwave signal having the desired amplitude and frequency. See T. Garrett, et al., "Generation of radio frequency radiation by femtosecond filaments," *Physical Review E* 104, L063201 (2021). Thus, none of the prior art demonstrated that the microwave signal produced from the laser pulses was controllable as in the present invention.

The present invention remedies these deficiencies in the prior art. As described in more detail below, in accordance with the present invention, an ultrashort laser pulse having a duration of about 10 picoseconds or less and a wavelength between approximately 0.2 and 12 microns produces a plasma in a gas through optical field ionization, with the motion of charged particles in the plasma causing generation of ultrawideband electromagnetic radiation from the plasma at microwave frequencies. The amplitude and the frequency of the microwave signal produced from this radiation can be controlled by changing the characteristics of the laser pulse that produces the plasma or by changing the pressure of the gas in which the plasma forms.

Thus, as described in more detail below, the present invention uses a plasma produced by an intense laser pulse to generate an ultrawideband microwave signal. The laser pulse originates from a laser source, and among other specifications, is characterized by its duration in time, its wavelength, and the amount of energy it contains. The plasma formed from this laser pulse has a finite duration and location within the gas, and it is important to distinguish the series of events that occur between the initial time and location of plasma creation and the extinction of the plasma by recombination, because the microwave signal is generated as one of the intermediate steps between these initial and final states.

FIG. 1 is a block schematic illustrating aspects of a method for controllably generating a predetermined microwave signal in accordance with the present invention, in which a laser pulse creates a plasma which then radiates a microwave signal having a predetermined amplitude and a predetermined frequency as a result of the characteristics of the laser pulse.

As shown in FIG. 1, in a first part 101 of the process, a laser pulse having a duration of approximately 10 picoseconds or less and a wavelength between approximately 0.2 and 12 microns initially propagates through a gas medium. The laser pulse must have a both sufficient pulse energy and a sufficiently short duration such that its focused intensity exceeds the ionization threshold of the gas medium, typically air, and forms a plasma within the medium.

The critical power $P_{crit}$ needed for self-focusing of a laser pulse having a given laser wavelength directed through a given gas medium is approximately $\lambda^2(2\pi n_0 n_2)^{-1}$, where $\lambda$ is the laser wavelength and $n_0$ and $n_2$, respectively, are the linear and nonlinear indices of refraction specific to the gas medium. The maximum instantaneous power of a laser pulse used in the method of the present invention typically will be higher than this critical power $P_{crit}$, as this condition is often met for laser pulses produced by conventional sources of ultrashort laser pulses, and it provides an additional ability to control the distance between the laser source and the location where the laser pulse creates the plasma. However, a laser power of $P_{crit}$ or greater is not strictly required, and laser pulses having different power may be used, so long as the power is sufficient to cause the formation of a plasma within the medium.

As described in more detail below, use of a laser pulse having such a short duration, having a particular wavelength, and having power sufficient for creating plasma from the gas permits propagation of the laser pulse—and generation of microwave signals therefrom—to be precisely controlled.

As illustrated in FIG. 1, as the laser pulse propagates through the gas, energy from the pulse starts ionizing the gas by separating electrons bound to the gas atoms, forming a plasma.

The laser pulse then continues propagating while creating more plasma along its axis of propagation. The plasma creation ceases when the laser pulse's intensity drops below the ionization threshold of the gas. The total length of the plasma is the distance between the points in space where the plasma creation starts and stops.

As the plasma is formed, some of the electrons at the surface of the plasma start expanding past the plasma-gas boundary to form an electron wave. As illustrated in FIG. 1, in this second part 102 of the process for controllably generating a microwave signal from a laser pulse in accordance with the present invention, the laser pulse continues propagating through the medium, continuing to generate a plasma as it travels, with the electron wave from the plasma carrying a current along the plasma surface.

The electron wave is formed when some of the electrons located near the boundary between the plasma and the neutral gas surrounding it have enough kinetic energy that they are able to travel past the boundary, and out into the gas. As the electron wave travels outward from the plasma, collisions between the electrons and neutral gas atoms impede the electrons' motion, as does the electrostatic attraction between the electrons and the region of plasma from which they departed.

These forces ultimately cause electrons to return to the plasma. However, while electrons in one location are executing this motion, other electrons in an adjacent location are just starting to do the same, with a small time delay from the laser pulse's propagation. The result of repeating this sequence of events ad infinitum from the start of the plasma to its termination is that the electron wave formed at the point where the plasma creation starts travels the length of the plasma. The electron wave carries a current at the plasma surface, and the current travels with it along the length of the plasma. As shown in step 103 illustrated in FIG. 1, as the current traverses the plasma, the current builds up an electromagnetic field that radiates away from the plasma as the plasma reaches its termination. This electromagnetic field is the ultrawideband microwave signal that the invention provides.

Any one or more of the laser pulse energy, the laser pulse duration, the laser wavelength, and/or the gas pressure of the gas medium that the laser pulse travels through can be tuned to produce a microwave signal having a predetermined amplitude and/or a predetermined frequency. This is because any one or more of these parameters influences the formation of the electron wave illustrated in FIG. 1, and therefore determine the rate of rise and the amount of current that travels along the plasma surface as a result of the electron wave. In addition, any one or more of these parameters also influences the length of the plasma, which determines the buildup of the electromagnetic field that radiates from the plasma as the ultrawideband microwave signal. The amount of current produced by the electron wave determines the microwave signal amplitude, while the current's rate of rise and buildup along the length of the plasma determine the microwave frequency spectrum.

Figure 2A:
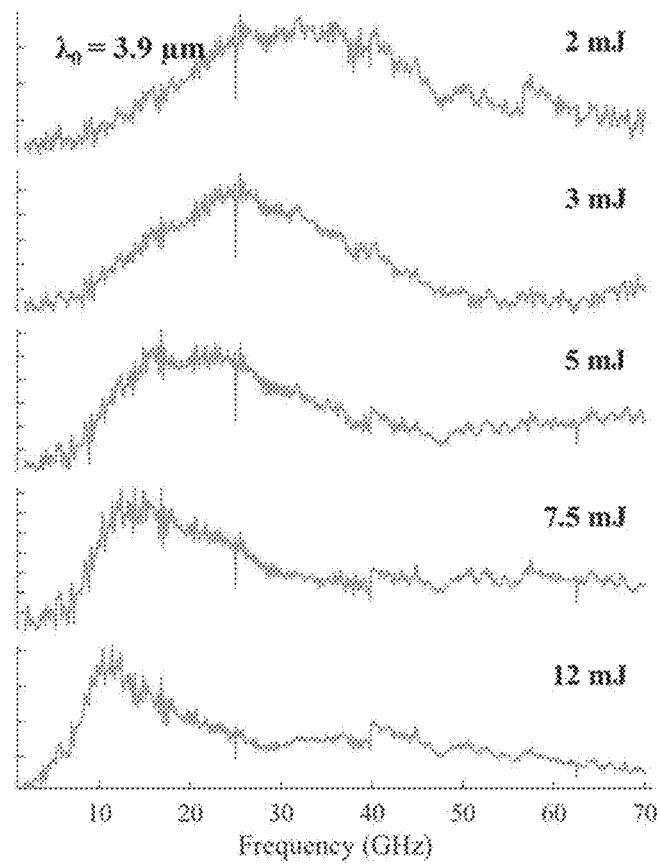
FIGS. 2A and 2B are plots of experimental data demonstrating control of the center frequency of the microwave spectrum by changing the laser pulse energy in accordance with the present invention.
Figure 2B:
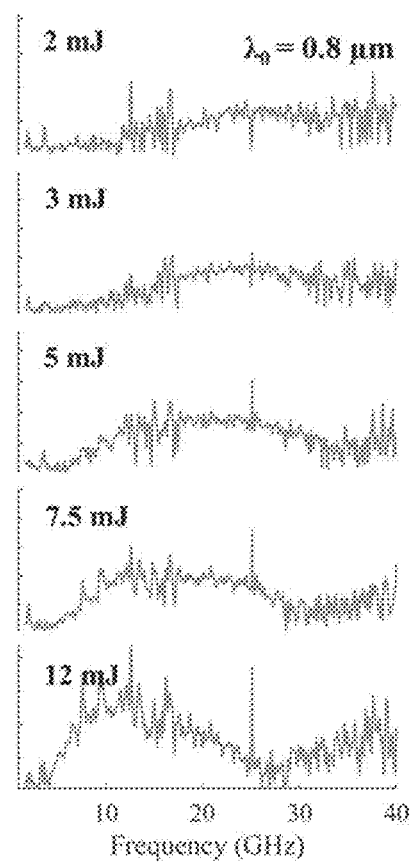

The plots in FIGS. 2A and 2B illustrate how the laser pulse energy can be used in accordance with the present invention to control the center frequency of the generated microwave signal, where FIG. 2A shows the frequency spectrum of the microwave signal generated by an exemplary laser pulse having a wavelength of 3.9 μm at exemplary energies ranging from 2 mJ to 12 mJ, and FIG. 2B shows the frequency spectrum of microwave signals generated by a laser pulse having the same energies but a wavelength of 0.8 μm. It should be noted that the values of the pulse energy given in FIGS. 2A and 2B are only representative of those typically achievable with existing ultrashort pulse laser sources, and laser pulses having different wavelengths and/or different energies can be used in the method of the present invention. The approximate minimum laser pulse energy that may be used in this invention in order to produce a microwave signal is 10 micro Joules (10 μJ). Values of laser pulse energy above this approximate amount are able to create plasmas in gas media given that the laser pulse duration is approximately 10 picoseconds or less.

The larger the laser wavelength is, the greater the maximum kinetic energy the electrons in the plasma possess in order to form the electron wave. Thus, an increase in the laser wavelength causes an increase in the current carried along the plasma, resulting in an increase in the microwave signal amplitude, while a decrease in the laser wavelength results in a decrease in the microwave amplitude.

Tuning the pulse energy for a pulse having a fixed pulse duration increases the plasma length, because a laser pulse with greater energy will ionize a volume of air with greater longitudinal extent before its energy is depleted to the level such that its intensity falls back below the gas medium's ionization threshold. The result of an increase in the plasma length is that the buildup of the electromagnetic field along the plasma, as illustrated in FIG. 1, favors lower microwave frequencies, resulting in a microwave signal whose center frequency is smaller. Conversely, a decrease in the laser pulse energy results in a decrease in the microwave amplitude and an increase in the center frequency. Tuning the laser pulse energy also increases the maximum kinetic energy of the electrons, and results in an increase in the microwave amplitude. However, the microwave amplitude is much more sensitive to changes in the laser wavelength than changes in the laser pulse energy.

Figure 3A:
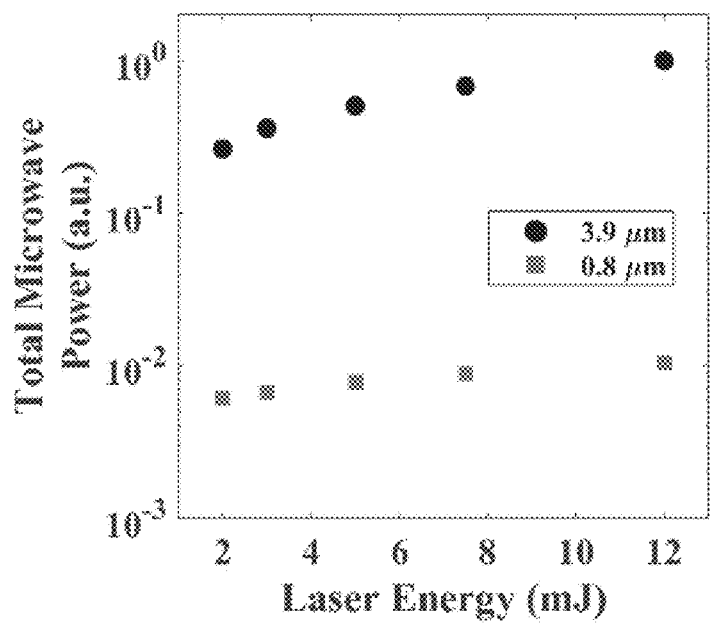
FIGS. 3A and 3B are plots showing how the amplitude of the microwave signal can be controlled by means of changing laser wavelength in accordance with the present invention.
Figure 3B:
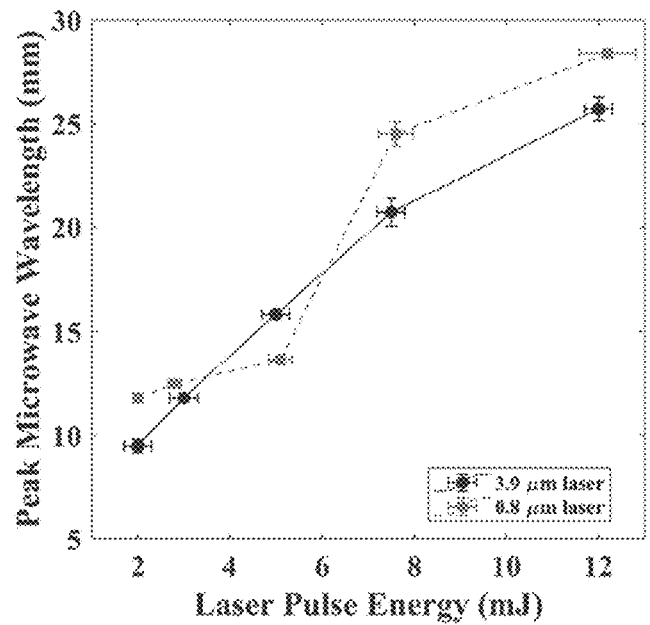

The plots in FIGS. 3A and 3B show how increasing the laser wavelength increases the microwave amplitude, i.e., the microwave power, though it has only a weak effect on the microwave frequency. Thus, as shown by the example data in FIG. 3A, at all laser energies between 2 and 12 mJ, the total power of a microwave signal generated by a laser pulse having a wavelength of 3.9 μm is almost two orders of magnitude higher than the power of a signal generated by a pulse having a wavelength of 0.8 μm. Similarly, FIG. 3B shows how the microwave signal wavelengths that represent the peak of the frequency spectra increase with increasing laser pulse energy. There is not a large difference between the peak wavelengths at each value of laser pulse energy, even though the difference in power is sizable. Consequently, the laser pulse energy and the laser wavelength can independently control the microwave signal's frequency and amplitude, respectively.

Figure 4A:
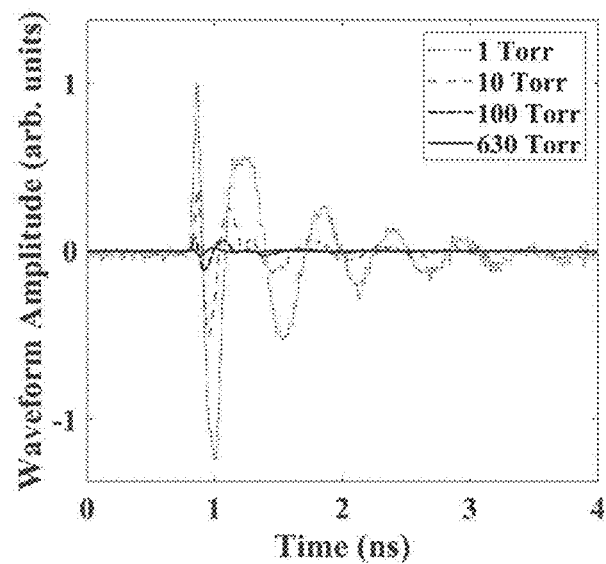
FIGS. 4A-4C are plots showing how the amplitude and frequency of the microwave signal can be tuned by controlling the pressure of the gas medium in accordance with the present invention.
Figure 4B:
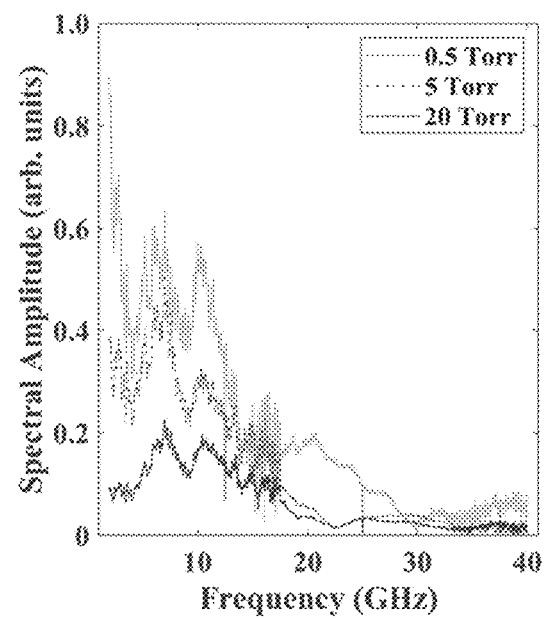
Figure 4C:
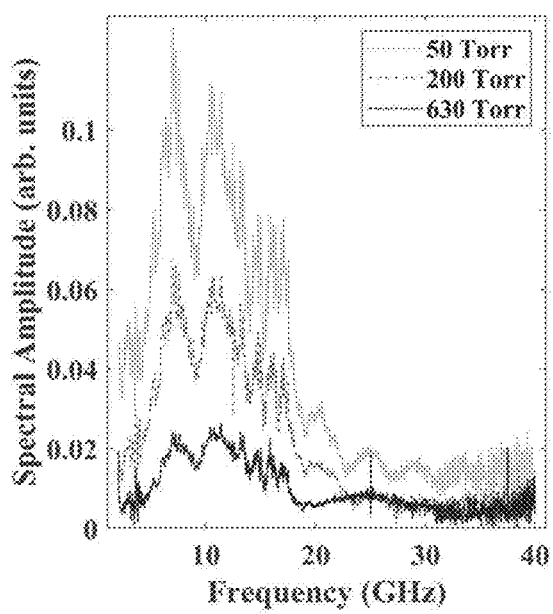

In addition, as illustrated by the plots in FIGS. 4A-4C, the amplitude and frequency of a microwave signal generated in accordance with the present invention can be further controlled by controlling the pressure of the gas medium into which the ultrashort laser pulse is fired. The plot in FIG. 4A shows the time evolution of the ultrawideband microwave waveforms at four values of air pressure between 1 and 630 Torr, and shows that at all times, the microwave signal has a higher amplitude at lower gas pressures. FIGS. 4B and 4C show the frequency spectra of the microwave signal at six different gas pressures, with FIG. 4B showing the frequency spectra at gas pressures between 0.5 and 20 Torr, and FIG. 4C showing the spectra at pressures between 50 and 630 Torr. As can be seen from the plots in FIGS. 4B and 4C, at low pressures, low frequencies increasingly dominate the spectra, with the lower frequencies being produced in greater degree at lower pressures.

Thus, as shown by the plots in FIGS. 2A-2B, 3B-3B, and 4A-4C, in accordance with the present invention a microwave signal can be generated from an ultrashort laser pulse directed into a gas medium, wherein a predetermined signal amplitude and/or predetermined signal frequency can be obtained by tuning the energy of the laser pulse, the wavelength of the laser pulse, and/or the pressure of the gas medium.

Another important aspect of the invention is controlling the location within the gas medium at which the laser pulse starts creating plasma and thus the location at which the laser pulse generates the microwave signal.

Figure 5A:
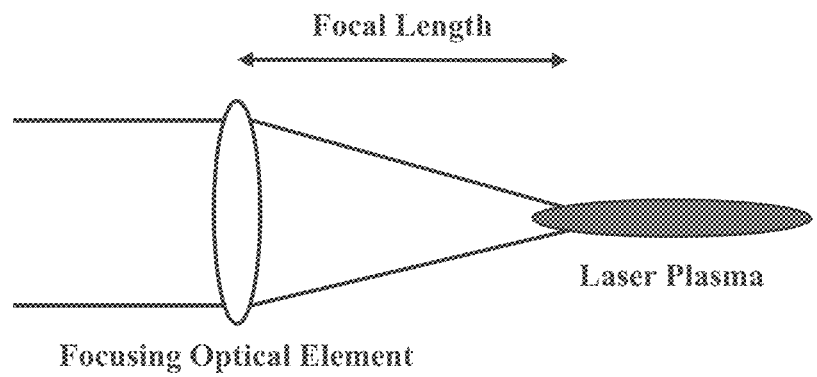
FIGS. 5A-5C are block schematics illustrating the techniques for controlling the distance between the laser that produces the laser pulses and the plasma that produces the microwave signal.
Figure 5B:
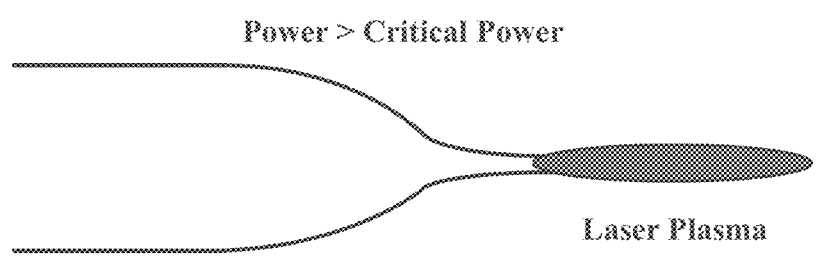
Figure 5C:
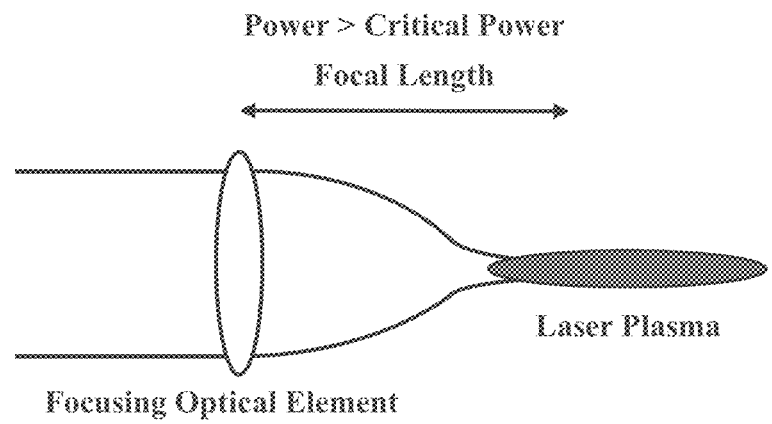

As illustrated by the block schematics in FIGS. 5A-5C, control of the location where the plasma creation starts can be accomplished in any one of several ways. Controlling this distance typically involves a focusing optical element like a lens or a curved mirror; however, because the invention uses short laser pulses that routinely exceed the threshold critical power for nonlinear self-focusing in gases, it is also possible to leverage the phenomenon of laser filamentation to regulate the plasma creation and thus the generation of the microwave signal.

FIG. 5A illustrates geometric focusing of a laser pulse that has a pulse power that is below the critical power for self-focusing, but has a focused intensity that exceeds the ionization threshold of the gas medium. In such a case, upon passing through the focusing optical element, the laser pulse will propagate a distance approximately equal to the focal length of the focusing optical element while focusing geometrically, and start ionizing the gas medium to create a plasma upon reaching a distance approximately equal to the focal length. The focal length of the focusing optical element is one of its properties and is typically determined by the element's shape, for example, the radius of curvature of a spherical lens.

FIG. 5B shows a different technique in which there is no focusing optical element, but where instead the laser pulse's power exceeds the self-focusing critical power and creates the plasma due to filamentation by means of the Kerr effect known in the art. In laser filamentation, the Kerr effect causes the refractive index of the gas to have a significant positive contribution that depends nonlinearly on the laser pulse's intensity. This leads to focusing of the laser pulse independent of any focusing optical elements, ultimately causing ionization of the gas and the creation of a plasma. Filamentation persists as long as there is sufficient energy in the pulse such that its power remains above the self-focusing threshold. When the plasma creation depletes enough energy from the pulse such that it is below the self-focusing threshold, the pulse diffracts and the plasma creation stops.

As illustrated in FIG. 5C, in some embodiments in accordance with the present invention, a laser pulse whose power is above the self-focusing threshold can be transmitted through a focusing optical element in order to combine the effects of geometric focusing and filamentation to control the plasma creation. This way it is possible to vary the onset distance of the plasma creation from a few centimeters to tens of meters, and possibly much farther.

The invention will also function with either geometric focusing or filamentation, and does not strictly require the laser pulse power to exceed the self-focusing threshold, although in many embodiments, continuous control of the plasma onset distance can be advantageously achieved with a combination of the two.

Thus the invention can be implemented either for short range applications, where the plasma produces a microwave signal near to the laser source, or for remote applications, where the laser pulse propagates for many meters before creating the plasma, leading to the generation of the microwave signal at a predetermined distance from the laser source.

In other embodiments in accordance with the present invention, a controllable microwave signal having a predetermined amplitude and/or frequency can be produced by use of multiple laser-produced plasmas. In both cases, the laser pulses can be controlled so that the thus-produced microwave signals experience spatial and temporal interference, resulting in a final predetermined microwave signal from the coherent addition of the multiple signals. This is analogous to a phased array of transmitting antennas, except in this case each plasma is an element of the array.

Figure 6A:
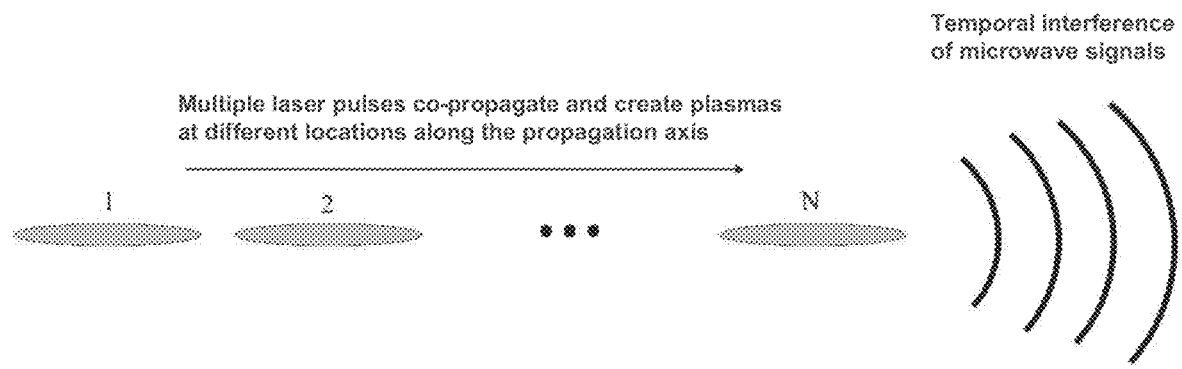
FIGS. 6A and 6B are block schematics illustrating aspects of additional embodiments of the invention wherein interference among microwave signals resulting from multiple laser-produced plasmas can be used to construct an ultrawideband microwave signal of desired amplitude and frequency.

Thus, as illustrated by the block schematic in FIG. 6A, in one exemplary embodiment, multiple laser pulses fired along a single propagation axis can generate multiple plasmas along the axis as the pulses travel through the gas medium. The characteristics of each individual plasma, such as the spatial location where each plasma starts and the spatial length of each plasma, can be independently tuned by controlling the pulse energy, pulse wavelength, and pulse focusing of each laser pulse in the manner described above. In addition, the interval of time between the creation of each plasma can be controlled in order to achieve the desired coherent addition of the microwave signals from each plasma to construct the final predetermined microwave signal. This can be accomplished by choosing the path lengths of the individual pulses such that the microwave signals from each of plasmas overlap in space and time, simultaneously. This can be implemented, for example, using a series of optical delay lines, which is a common technique in the field for achieving spatio-temporal coincidence of ultrashort laser pulses. Such multiple plasmas arranged along the same propagation axis can be used to generate and superimpose multiple copies of the same microwave signal in time, resulting in an amplification of the original signal. By controlling the characteristics of the pulses and the time spacing between them, an amplified microwave signal having a predetermined amplitude can be produced.

Figure 6B:
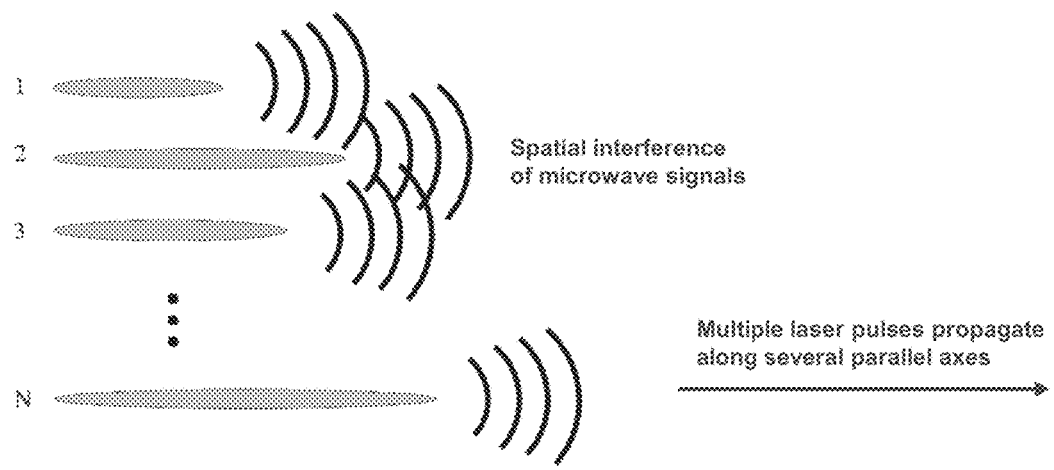

In another embodiment, such as that illustrated by the block schematic in FIG. 6B, multiple laser pulses propagate along side-by-side propagation axes. In this case, the ultra-wideband microwave signals generated by the multiple laser pulses can interfere with one another to produce a predetermined spatial and temporal radiation pattern. As with the multiple plasmas generated along a single propagation axis, the spatial location and length of each of the side-by-side plasmas can be tuned by tuning the pulse energy, pulse wavelength, and pulse focusing of each laser pulse that produces the plasma, while the time spacing can be controlled by choosing the path length that each pulse traverses.

The multiple laser pulses used in this embodiment can be generated in any suitable way. There are several possible ways to divide the energy of an original laser pulse or a few laser pulses from a single laser source using passive or active optical elements. For example, the multiple pulses can be generated via use of one or more beam splitters (an example of a passive approach) or an acousto-optic modulator (an example of an active approach) that divide the energy of an original laser pulse from a single laser source into the number of copies needed to produce the desired microwave signal. Alternatively, the multiple laser pulses can be generated through the use of multiple laser sources whose pulses are appropriately synchronized or otherwise staged in time and space using, e.g., an electronic or electro-optical timing signal. The amplitude and frequency of the microwave signal from each individual plasma within the array can be controlled using the methods described above so that the coherent addition of signals resulting from the array also has the desired amplitude and frequency.

Advantages and New Features

Considerations of how the invention compares to existing technologies may be categorized into two sub-groups. The first is electronic waveform generators, including arbitrary waveform generators that use ultrashort laser pulses. The second are plasma-based sources of microwaves where the plasma is created by ionizing a gas with a laser.

Electronic waveform generators have three primary limitations compared to the invention: their ability to radiate their signals in free space, the need for a photodetector that converts an optical signal into an electrical one, and the distance they can transmit signals.

The usual method for radiating an ultrawideband signal into free space is to feed it to multiple transmitting antennas that each radiate a portion of the total bandwidth of the microwave signal. For ultrawideband signals, this can require many antennas arranged in an array, which itself must be correctly designed to produce the desired interference of each part of the ultrawideband signal's bandwidth in free space.

Specially designed impulse-radiating antennas also exist that are meant to preserve the signal's bandwidth upon its transmission into free space, but even these usually have the effect of partially filtering some of the bandwidth. The invention obviates the need for an antenna array, or an impulse-radiating antenna in order to transmit a single ultrawideband microwave signal.

The requirement of a photodetector that converts an optical signal into an electrical one is specific to the ultrashort laser pulse-based arbitrary waveform generators, and is the critical limiting element of these methods. It must have greater sensitivity, bandwidth, dynamic range, and faster response time than that of the laser pulse envelope in order to reproduce it without distortion. The different kinds of photodetector technologies are rather mature, generally speaking, nonetheless it is in principle quite simple to construct a laser envelope that any photodetector would not be able to convert without distortion. Furthermore, the output power of such arbitrary waveform generators is limited to that at which the photodetector experiences saturation. It is of course possible to add a broadband microwave amplifier in series after the photodetector to increase the power, but any microwave amplifier will impose amplitude and phase distortions, typically leading to significant elongation of the microwave signal in time. While there are limitations to the amount of microwave power the invention can produce, there are straightforward methods for addressing the limitation that do not involve an amplifier, such as moving the onset of plasma creation closer to the object that will receive or otherwise interact with the microwave signal, or creating a coherent superposition of multiple copies of the signal in free space by using multiple laser pulses to create an array of microwave-generating plasmas. Further, by virtue of not being constructed from solid materials, the plasma has $n_0$ damage threshold. Unlike an electronic device, overpowering the microwave signal generator in this case does not result in destruction, but it would result in loss of control of the microwave signal.

Existing ultrawideband transmitter technologies are typically limited to short-range applications because of propagation losses at high frequencies due to diffraction. While the invention is also capable of short-range microwave transmission, by choosing the correct focusing optical element and extending the onset distance for filamentation, it is possible to create the plasma, and therefore the microwave signals at long distances.

For example, in remote sensing, the power of the return signal (whether or not it is ultrawideband) scales like $1/r^4$, where r is the distance between the transmitter and remote object under interrogation. Because the invention enables a way to move the microwave source close to the distant object, it would exponentially improve the distance scaling of the return signal power to $1/r^2$. The invention provides a way to overcome a severe limitation of existing ultrawideband signal generators, and may be particularly useful in remote sensing.

The present invention provides distinct advantages over prior cases where laser-produced plasmas have been used to generate microwaves. Previously proposed laser-plasma based microwave sources and measurements are inherently narrowband, and therefore would serve different technological applications if transitioned from the laboratory. While there have been reports of high intensity laser pulses producing electromagnetic pulses during experiments conducted inside vacuum chambers, in which part of the frequency spectrum of the electromagnetic pulse would overlap that sought by this invention, in such cases, the laser sources used are facility-scale machines, and the electromagnetic pulses are an unwanted byproduct of the experiment whose characteristics are significantly influenced by the fact that the laser pulse interaction takes place under vacuum. Therefore, these laser sources and experiments are not an alternative method for the present invention.

Ultrashort lasers have also been used to produce terahertz (THz) signals. While microwave signals are defined as being within the frequency range from 3-300 GHz, terahertz radiation spans the wavelength range from 300 GHz to 10 THz. The terahertz signals can either be generated by optical rectification by transmitting the laser pulse through a nonlinear crystal, or as in the invention, by producing a plasma in a gas. However, the physical generation mechanism of the terahertz signal is different from the ultrawideband microwave signal, as the former is not predicated upon expansion of electrons from the plasma that travels in a wave along the plasma-gas boundary.

More importantly, owing to the different frequency regimes of the microwaves and terahertz, their technological uses are fundamentally different. For example, microwaves readily interact with existing electronic technologies, whereas there are relatively few terahertz electronic devices.

Additionally, in applications such as material identification and spectroscopy, the methods for measuring the material responses to microwave versus terahertz signals are distinct. Perhaps most significant is the fact that terahertz frequencies are strongly absorbed in the atmosphere, whereas it is generally transparent to microwaves. This critical difference in the ability to transmit microwave versus terahertz signals through the air significantly differentiates the possible applications of the present invention from those that would use the terahertz signals.

Thus, as described herein, a microwave signal can be controllably produced from a plasma generated by an ultrashort laser pulse fired into a gas medium, wherein the amplitude and/or the frequency of the microwave signal can be tuned by controlling the laser pulse energy, the laser wavelength and/or the gas pressure of the medium through which the laser pulse propagates. The location within the gas medium where the signal is generated can be controlled by controlling the location within the medium where the laser pulse begins creating the plasma.

Although particular embodiments, aspects, and features have been described and illustrated, one skilled in the art would readily appreciate that the invention described herein is not limited to only those embodiments, aspects, and features but also contemplates any and all modifications and alternative embodiments that are within the spirit and scope of the underlying invention described and claimed herein. The present application contemplates any and all modifications within the spirit and scope of the underlying invention described and claimed herein, and all such modifications and alternative embodiments are deemed to be within the scope and spirit of the present disclosure.

What is claimed is:

1. A method for controllably generating an ultrawideband microwave signal, comprising:

directing an ultrashort laser pulse having a predetermined pulse wavelength and predetermined pulse energy into a gas medium having a predetermined gas pressure;

wherein an intensity of the laser pulse causes the formation of a plasma having a predetermined temporal and spatial duration in the gas medium that travels with the laser pulse as the laser pulse propagates through the gas;

the plasma generating an electron wave in the gas medium that moves with the plasma as it travels through the gas until the plasma terminates, the electron wave generating a current that travels the length of the plasma until it terminates;

wherein the current creates an electromagnetic field that radiates away from the plasma to form an ultrawideband microwave signal having a predetermined amplitude and frequency when the plasma reaches the end of its spatial and temporal duration;

wherein the amplitude and frequency of the microwave signal is tunably controlled by controlling the wavelength of the laser pulse, the energy of the laser pulse, and/or the gas pressure of the gas medium.

2. The method according to claim 1, wherein the laser pulse has a pulse duration of about 10 picoseconds or less.

3. The method according to claim 1, wherein the laser pulse has a wavelength between about 0.2 to about 12 μm.

4. The method according to claim 1, wherein the laser pulse has a pulse energy that is greater than about 10 micro-Joules.

5. The method according to claim 1, wherein the laser pulse has a pulse energy between about 2 mJ and 12 mJ.

6. The method according to claim 1, wherein the laser pulse has a focused intensity that exceeds an ionization threshold of the gas medium.

7. The method according to claim 1, wherein the laser pulse has a maximum instantaneous power that is higher than a critical power needed for self-focusing of the laser pulse;

wherein the laser pulse creates the plasma due to filamentation by means of the Kerr effect.

8. The method according to claim 1, further comprising controlling a location at which the microwave signal is generated by controlling a location within the gas medium at which the plasma is formed.

9. The method according to claim 8, further comprising directing the laser pulse through a focusing optical element to control the location within the gas medium at which the plasma is formed.

10. The method according to claim 8, further comprising directing a laser pulse having an energy that exceeds a self-focusing critical power $P_{crit}$ through a focusing optical element to control the location within the gas medium at which the plasma is formed.

11. The method according to claim 1, further comprising directing a plurality of ultrashort laser pulses into the gas medium along a single propagation axis, each of the laser pulses having the same predetermined pulse energy and pulse wavelength;

wherein each of the laser pulses generates a corresponding plasma as it propagates through the gas medium, each of the plasmas producing a corresponding microwave signal so as to produce a plurality of microwave signals along the single propagation axis within the gas medium, each of the microwave signals having the same amplitude and the same frequency;

wherein the plurality of the microwave signals become superimposed upon one another as they propagate through the gas medium so as to form an amplified microwave signal from the plurality of microwave signals, the amplified microwave signal having a predetermined amplified amplitude and frequency.

12. The method according to claim 1, further comprising directing a plurality of laser pulses into the gas medium along a plurality of side-by-side propagation axes, each of the laser pulses having the same predetermined pulse energy and pulse wavelength;

wherein each of the laser pulses generates a corresponding plasma as it propagates through the gas medium, each of the plasmas producing a corresponding microwave signal so as to produce a plurality of microwave signals along the side-by-side propagation axes within the gas medium, each of the microwave signals having the same amplitude and the same frequency;

wherein the plurality of the microwave signals become superimposed upon one another as they propagate through the gas medium so as to form an amplified microwave signal from the plurality of microwave signals, the amplified microwave signal having a predetermined amplified amplitude and frequency.

13. The method according to claim 11, wherein the plurality of laser pulses is generated via one or more optical elements that divide the pulse energy of an initial laser pulse into the number of copies needed to produce the desired microwave signal.

14. The method according to claim 11, wherein the plurality of laser pulses are generated from multiple laser sources whose pulses are appropriately synchronized and/or staged in time and space so as to generate the plurality of microwave signals to generate an amplified microwave signal having a predetermined amplified amplitude and frequency.

* * * * *